(12) United States Patent
Santin et al.

(10) Patent No.: US 8,091,184 B2
(45) Date of Patent: Jan. 10, 2012

(54) FESTOONED TRIM CLIP SYSTEM AND METHOD FOR ATTACHING FESTOONED CLIPS TO A SUBSTRATE

(75) Inventors: Andrew W. Santin, Newton, MA (US); David F. Jones, Northboro, MA (US); Pasquale Rossi, Sarnia (CA); Timothy E. T. Scott, Mississauga (CA)

(73) Assignee: Hope Global, division of NFA Corp., Cumberland, RI (US)

( * ) Notice: Subject to any disclaimer, the term of this patent is extended or adjusted under 35 U.S.C. 154(b) by 758 days.

(21) Appl. No.: 11/737,362

(22) Filed: Apr. 19, 2007

(65) Prior Publication Data
US 2008/0258523 A1 Oct. 23, 2008

(51) Int. Cl.
*B32B 3/06* (2006.01)
(52) U.S. Cl. .......... 24/297; 248/74.2; 248/68.1; 24/336; 24/338; 24/339
(58) Field of Classification Search ........................ None
See application file for complete search history.

(56) References Cited

U.S. PATENT DOCUMENTS

| | | |
|---|---|---|
| 3,632,164 A | 1/1972 | Radke |
| 3,649,974 A | 3/1972 | Baruth et al. |
| 3,747,178 A | 7/1973 | Harder |
| 3,794,378 A | 2/1974 | Haslam et al. |
| 3,981,534 A | 9/1976 | Wilton |
| 3,988,034 A | 10/1976 | Fister |
| 3,995,892 A | 12/1976 | Hellman et al. |
| 4,663,211 A | 5/1987 | Kon |
| 4,673,542 A | 6/1987 | Wigner et al. |
| 4,861,104 A | 8/1989 | Malak |
| 4,881,997 A | 11/1989 | Hatch |
| 4,933,224 A | 6/1990 | Hatch |
| 4,988,282 A | 1/1991 | Fukui |
| 5,005,242 A | 4/1991 | Kennedy et al. |
| 5,013,090 A | 5/1991 | Matsuura |
| 5,023,125 A | 6/1991 | Gray |

(Continued)

FOREIGN PATENT DOCUMENTS

CA 2165930 A1 6/1996

(Continued)

*Primary Examiner* — Jack W. Lavinder
(74) *Attorney, Agent, or Firm* — William A. Loginov, Esq.; Loginov & Associates, PLLC

(57) ABSTRACT

This invention provides a single or multi-ganged clip that can be grouped into a festooned arrangement. That is, a plurality of clips are arranged together into a discrete assembly along a line of extension so that a human or automated handler can retrieve a grouping, separate one-clip-at-a-time from the grouping, and apply the separated clip to a mold cavity or other assembly structure. Each clip can include a base with opposing ends aligned in the direction of extension and transverse to an elongation direction for a connecting segment (if any) between ganged clip members. In an illustrative embodiment, these base ends include opposing male and female connectors. In this embodiment the male connector is a cylinder with an axis that extends transverse to the direction of elongation and the female connector defines a conforming cylindrical inner diameter, which allows it to nest over the male cylinder. A gap opening is provided at the far edge of the female connector to provide clearance for the base that connects the male cylinder to the clip member base end. This gap can be sized to allow a predetermined range of angular rotation of the male connector within the female connector. Clips can be stored as discrete groupings that are stacked in a container, or paid out in a continuous grouping from a spool.

19 Claims, 15 Drawing Sheets

U.S. PATENT DOCUMENTS

| | | | |
|---|---|---|---|
| 5,028,472 A | 7/1991 | Gray | |
| 5,110,649 A | 5/1992 | Morse et al. | |
| 5,180,618 A | 1/1993 | Kessler et al. | |
| 5,236,243 A | 8/1993 | Reyes | |
| 5,259,905 A | 11/1993 | Gilcreast | |
| 5,273,597 A | 12/1993 | Kumagai et al. | |
| 5,286,431 A | 2/1994 | Banfield et al. | |
| 5,326,151 A | 7/1994 | Smith et al. | |
| 5,338,092 A | 8/1994 | Wiltsey et al. | |
| 5,342,569 A | 8/1994 | Murasaki | |
| 5,401,075 A | 3/1995 | Venuto et al. | |
| 5,459,907 A | 10/1995 | Nivet | |
| 5,582,463 A | 12/1996 | Linder et al. | |
| 5,605,373 A | 2/1997 | Wildern et al. | |
| 5,641,552 A | 6/1997 | Tillner | |
| 5,658,046 A | 8/1997 | Rus | |
| 5,718,478 A | 2/1998 | Allison | |
| 5,733,001 A | 3/1998 | Roberts | |
| 5,766,723 A | 6/1998 | Oborny et al. | |
| 5,786,061 A | 7/1998 | Banfield | |
| 5,827,546 A | 10/1998 | Burchi et al. | |
| 5,827,547 A | 10/1998 | Burchi et al. | |
| 5,882,073 A | 3/1999 | Burchi et al. | |
| 5,900,303 A | 5/1999 | Billarant | |
| 6,009,676 A | 1/2000 | Feldpausch et al. | |
| 6,173,545 B1 | 1/2001 | Feldpausch et al. | |
| 6,177,155 B1 | 1/2001 | Kurosaki | |
| 6,397,638 B1 | 6/2002 | Roell | |
| 6,406,093 B1 | 6/2002 | Miotto et al. | |
| 6,431,585 B1 | 8/2002 | Rickabus et al. | |
| 6,592,181 B2 | 7/2003 | Stiller et al. | |
| 6,656,563 B1 | 12/2003 | Leach et al. | |
| 6,668,429 B2 | 12/2003 | Fujisawa et al. | |
| 6,838,155 B2 | 1/2005 | Cappucci et al. | |
| 2001/0007166 A1 | 7/2001 | Shimamura et al. | |
| 2002/0101109 A1 | 8/2002 | Stiller et al. | |
| 2003/0001421 A1 | 1/2003 | Schmidt | |
| 2003/0072912 A1 | 4/2003 | Itoh et al. | |
| 2003/0134083 A1 | 7/2003 | Wang et al. | |
| 2003/0162008 A1 | 8/2003 | Cappucci et al. | |
| 2003/0204939 A1 | 11/2003 | Fujisawa et al. | |
| 2003/0213105 A1 | 11/2003 | Bednarski | |
| 2003/0215601 A1 | 11/2003 | Pedde et al. | |
| 2003/0236315 A1 | 12/2003 | Xie et al. | |
| 2003/0236316 A1 | 12/2003 | Heumen et al. | |
| 2004/0061254 A1 | 4/2004 | Snooks | |
| 2004/0064894 A1 | 4/2004 | Labish | |
| 2004/0082674 A1 | 4/2004 | Smith et al. | |
| 2004/0137192 A1 | 7/2004 | McVicker | |
| 2004/0195877 A1 | 10/2004 | Demain et al. | |
| 2005/0006944 A1 | 1/2005 | Ali | |

FOREIGN PATENT DOCUMENTS

| | | |
|---|---|---|
| CA | 2368739 A1 | 7/2002 |
| CA | 2420373 AA | 8/2003 |
| CA | 2427371 A1 | 11/2003 |
| DE | 4446450 C1 | 4/1996 |
| DE | 19530397 A1 | 2/1997 |
| DE | 29821697 U1 | 3/1999 |
| DE | 29822649 U1 | 5/1999 |
| DE | 29917372 U1 | 2/2000 |
| DE | 19949423 C1 | 1/2001 |
| DE | 19959235A1 B1 | 6/2001 |
| EP | 0421258 A1 | 4/1991 |
| EP | 0532820 A1 | 3/1993 |
| EP | 0433100 B1 | 4/1994 |
| EP | 0439969 B1 | 7/1994 |
| EP | 0537333 A1 | 9/1995 |
| EP | 070800 A2 | 4/1996 |
| EP | 0727294 A1 | 8/1996 |
| EP | 0667257 B1 | 7/1998 |
| EP | 0720900 B1 | 3/1999 |
| EP | 0960782 A1 | 12/1999 |
| EP | 0990554 A1 | 5/2000 |
| EP | 1000855 A2 | 5/2000 |
| EP | 1116450 A2 | 7/2001 |
| EP | 0900030 B1 | 7/2002 |
| EP | 1243462A2 B1 | 9/2002 |
| EP | 0990546 B1 | 3/2003 |
| EP | 1300229 A1 | 4/2003 |
| EP | 0960783 B1 | 6/2003 |
| EP | 1358826 A1 | 11/2003 |
| EP | 0960782 B1 | 1/2004 |
| EP | 1000856 B1 | 1/2004 |
| EP | 1220628 B1 | 5/2004 |
| GB | 1560234 B1 | 1/1980 |
| GB | 2238708 A1 | 6/1991 |
| WO | 8603164 A1 | 6/1986 |
| WO | 9219119 | 11/1992 |
| WO | 9501741 A1 | 1/1995 |
| WO | 9720690 A1 | 6/1997 |
| WO | 9805232 A1 | 2/1998 |
| WO | 9820766 A1 | 5/1998 |
| WO | 0071382 A1 | 11/2000 |
| WO | 0100386 A1 | 1/2001 |
| WO | 0124665 A1 | 4/2001 |
| WO | 0189338 A2 | 11/2001 |
| WO | 0205686 A2 | 1/2002 |
| WO | 03031223 A1 | 4/2003 |
| WO | 03058005 A2 | 7/2003 |
| WO | 03059111 A1 | 7/2003 |
| WO | 03070509 A2 | 8/2003 |
| WO | 03072390 A1 | 9/2003 |
| WO | 2004028789 A1 | 4/2004 |
| WO | 2004058496 A1 | 7/2004 |
| WO | WO2007008662 A2 | 1/2007 |

FESTOONED TRIM CLIP SYSTEM AND METHOD FOR ATTACHING FESTOONED CLIPS TO A SUBSTRATE

FIELD OF THE INVENTION

This invention relates to trim and upholstery attachment mechanisms, and more particularly to clips for attaching trim and upholstery to foam and other resilient or flexible substrates.

BACKGROUND OF THE INVENTION

Modern fabric trim covers (upholstery), such as those used in vehicles, often carefully sculpted and shaped to produce a comfortable and aesthetically pleasing effect. As such, the fabric (typically cloth, vinyl or leather with an appropriate backing material) is secured at many locations along its surface to a resilient or flexible backing that defines the cushioned substrate of the upholstered item (for example, a seat bottom, cushion, back or headrest). The substrate is typically constructed from a resilient material. This resilient/flexible material can be synthetic foam (for example polyurethane and/or isocyanate-based foam) or another cushioning material, such as traditional rubberized horsehair, hoghair, and the like. In general, the close-fitting appearance of the upholstery to the substrate requires that the fabric be tacked down to the substrate at any intermediate dips, Vees or trenches in the surface. Otherwise, the fabric will tend to billow or "tent" at these non-planar surface features.

Traditional methods for tacking down trim covers at trenches entail the use of a plastic bead along the inner side of the trim cover. This bead is often located at an inner seam that is a sewn or welded, or otherwise adhered, joint between fabric pieces. Likewise the foam substrate includes an exposed metal wire that may be molded into the substrate along a trench in its surface during its construction. So-called "hog-rings," consisting of bendable metal ringlets, are then secured to both the plastic bead and the metal wire. These rings are each applied by a tool, such as a hog-ring gun from a supply of wire. As each hog ring is secured, it forms an immovable, permanent joint between the fabric and the substrate. Clearly, this permanent joint is difficult to repair if needed and requires significant skill to create in the first place. In addition, this method of seat cover attachment leads to the development of injuries, such as carpal tunnel syndrome in employees who operate the hog ring tool over an extended period of time. Finally, the use of metal components may be undesirable where the seat includes electrical heating elements due to the metal's predisposition to conduct both heat and electricity.

More recently, trim covers have been secured to resilient substrates using detachable connections that allow repairs to be effected and are often more-easily applied without the used of highly skilled labor. In one example, one side of a hook and loop fastener is attached to a trench in the resilient substrate. The inner surface of the trim cover carries the opposing side of the fastener. This approach is reliable, but expensive, in terms of material wasted and consumed to attain a secure fit. It also requires a rather large-width trench to be formed in the resilient substrate to ensure a sufficient area of engagement between fastener sides.

Another recent approach involves the used of a series of clips that are molded into the trench as a foam substrate is manufactured. A version of this structure, and other prior art attachment mechanisms, are described in U.S. Published Patent Application US/2003/0215601 A1, entitled ATTACH-MENT DEVICE, dated Nov. 20, 2003, by Peede, et al. the teachings of which are expressly incorporated herein by reference. A simplified version of such a clip and its use are shown in FIGS. 1-3 herein. As shown particularly in FIGS. 1 and 2, each clip 100 includes a pair of outwardly facing (with respect to the trim-cover-facing surface of the substrate) legs 102 that together form a female projection 104 with a pair of upper hooks or barbs 106 that face toward each other, thereby defining a top-end funnel, leading into a cavity 110. The barbs 106 define a narrow gap 112 therebetween. This gap 112 is smaller in width than the width of the cavity 110. The material and relative thickness of the legs 102 is such that the barbs 106 can be spread elastically apart so that an appropriately sized cylinder can pass between the legs to be thereafter trapped in the cavity against outward movement by the sprung-back barbs 106. In this case, the cylinder is the covered plastic or metal bead 120 attached to a seam 122 between two trim cover fabric pieces 124 and 126. This bead assembly is also known as "listing" in the industry. In this example, the bead 120 is surrounded by a piece of non-woven covering 130 that retains the bead against the bottom of the seam 122 using stitching 132 (or another attachment mechanism). Collectively the diameter of the bead 120 and covering 130 define an outer diameter ODB approximately equal to, or slightly less than, the lateral width WB of the cavity 110. Thus, in operation, an installer need only press the bead 120 down between the barbs 106 (arrow 140) so that the angled funnel tops of the barbs cause the legs 102 to spread, allowing the bead 120 to pass therebetween. Once the bead 120 passes fully between the barbs 106, then the bead 120 is mechanically retained beneath the barbs 106 within the cavity, and the seam 122 (and facing cover 130), extend through the gap 112 to hold that particular part of the trim cover (124 and 126) against the clip 100.

The clip includes a base 150 having a relatively thin cross section and an increased surface area adapted to act as an anchor within the (foam) substrate material 252. As shown (FIG. 2), the base is disposed beneath the surface of a trench 254. The base is locked into the matrix of the substrate as a result of the molding process in which foam covers the base and adheres to the base's material. Typically, the clip 100 is mounted in the bottom of a trench 254 as shown. In this manner, sufficient setback is provided to allow the seam 122 to sink into the substrate for a taut fit against its surface.

FIG. 3 shows an exemplary vehicle seat foam cushion 310 according to the prior art. A plurality of clips 100 are located along the trench at an appropriate degree of spacing so as to ensure that the bead of the trim cover defines a continuous, unsegmented shape. In the example of a seat bottom or back, approximately 12-30 clips may be needed to define a desired shape. In general, the tighter the curvature of the substrate, the smaller the clip spacing provided. The above-referenced published U.S. patent application contemplates that the spacing between clips can be regulated, in part, by providing fixed-space, flexible connectors between individual clips and molding such clips into the foam substrate with the predetermined spacing defined by the connectors.

The above-prior art clips typically constructed from a resilient material, which allows for the flexure imparted by insertion of the bead into their respective cavities. However, these clips should also adhere firmly to the foam or other resilient substrate material. Hence, the clip material should exhibit properties so that it appropriately adheres to the substrate so that it will not eventually detach under long-term use.

The process of inserting clips into a foam mold cavity, used for example to form seat parts, is typically a manual operation that is time-consuming, labor-intensive and sometimes subject to inaccurate placement. Clips are dispensed from inside loosely packed boxes, and each one must be individually picked, reoriented properly, and inserted into the appropriate location in the mold cavity for subsequent foam application thereover. This process contains inherent inefficiencies that the worker cannot fully overcome. Moreover, loosely packing ganged groups of clips, connected by intermediate connecting segments further complicates handling. It has been found that a loosely packed supply of ganged clips generally assumes a "bird's nest" entanglement that is extremely difficult to unravel.

Accordingly it is desirable to provide a system for dispensing clips that makes their orientation predictable, and handling more efficient. It is further desirable that the system entail minimal or no waste, and potentially allow for the placement of multiple "ganged" clips into the foam mold cavity at one time. The clips of this system should also display good general adhesion to foam so as to minimize subsequent detachment or pullout, while still withstanding normal cyclic loads and other stresses likely to be encountered in assembly and subsequent long-term use.

SUMMARY OF THE INVENTION

This invention overcomes the disadvantages of the prior art by providing a single or multi-ganged clip that can be grouped into a festooned arrangement. That is, a plurality of clips are arranged together into a discrete assembly along a line of extension so that a human or automated handler can retrieve a grouping, separate one-clip-at-a-time from the grouping, and apply the separated clip to a mold cavity or other assembly structure. Each clip can include a base with opposing ends aligned in the direction of extension and transverse to an elongation direction for a connecting segment (if any) between ganged clip members. In an illustrative embodiment, these base ends include opposing male and female connectors. In this embodiment the male connector is a cylinder with an axis that extends transverse to the direction of elongation and the female connector defines a conforming cylindrical inner diameter, which allows it to nest over the male cylinder. A gap opening is provided at the far edge of the female connector to provide clearance for the base that connects the male cylinder to the clip member base end. This gap can be sized to allow a predetermined range of angular rotation of the male connector about its axis within the female connector. Clips can be stored as discrete groupings that are stacked in a container or paid out in a continuous grouping from a spool.

In an alternate embodiment, the male connector can be side braces that extend from the clip member's base end and thereby define a slot between the base end and the male cylinder. The female connector can be sized in lateral width and thickness to ride within the slot as the adjoining clips are angularly rotated with respect to each other. This arrangement affords a greater range or bending that can be useful in continuous feed implementations. The bases of clip members can be provided with holes that are engaged by a tractor pin-feed mechanism, or another drive formation can be provided to the clips. Any of the clips contemplated herein can be assembled into unitary or detachable multi-ganged arrangements of clip members separated by (narrowed) connecting segments. In a dual ganged configuration, male and female connectors on opposing clip members of a given clip can be located on opposite base end sides, thereby allowing clips to be attached to each other ambidextrously.

The above-described clips, and other types clips that are adapted to be mounted within foam, can be constructed from a material that reacts chemically with the foam in a liquid state. An illustrative material is polycarbonate, and it is expressly contemplated that other similar materials with needed heat-resistance, durability and (optionally) surface reactivity to liquid foam can be employed to construct clips and/or clip member bases in accordance with this invention.

BRIEF DESCRIPTION OF THE DRAWINGS

The invention description below refers to the accompanying drawings, of which.

DETAILED DESCRIPTION

Figure 4:
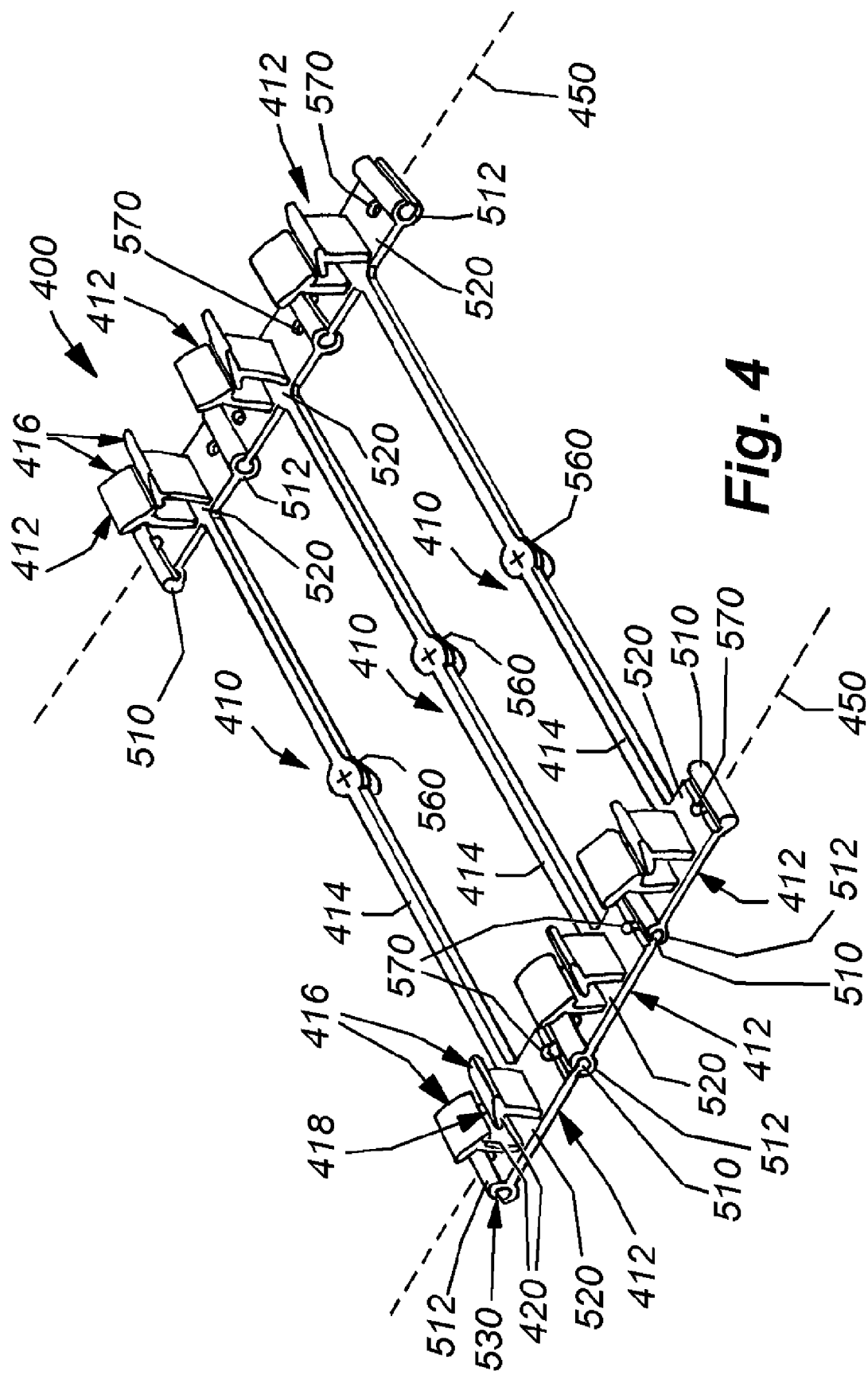
FIG. 4 is a perspective view of an exemplary festooned grouping of a plurality of dual-ganged clips according to an illustrative embodiment of this invention.
Figure 5:
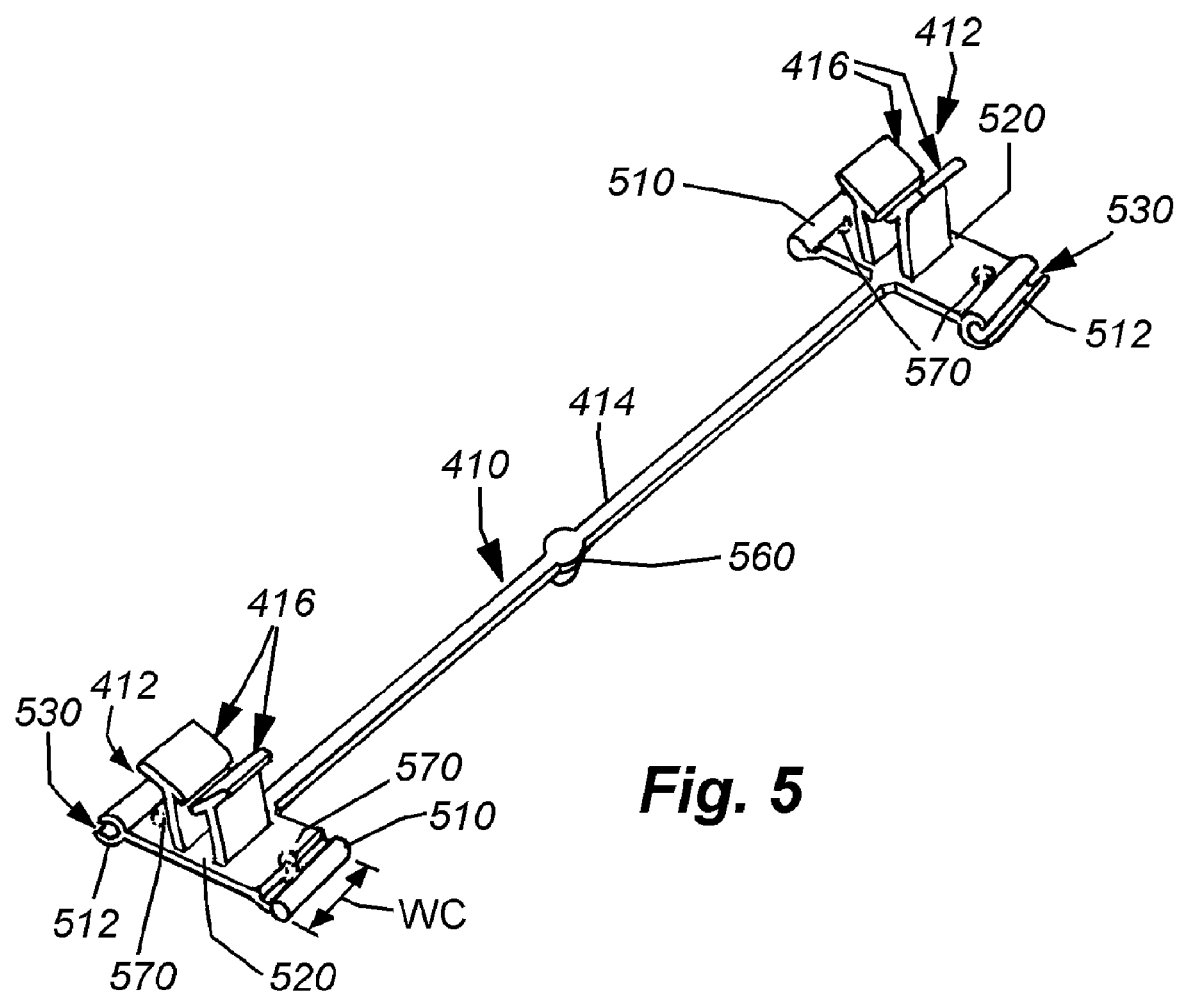
FIG. 5 is a perspective view of a single dual-ganged clip from the festooned grouping of FIG. 4.
Figure 6:
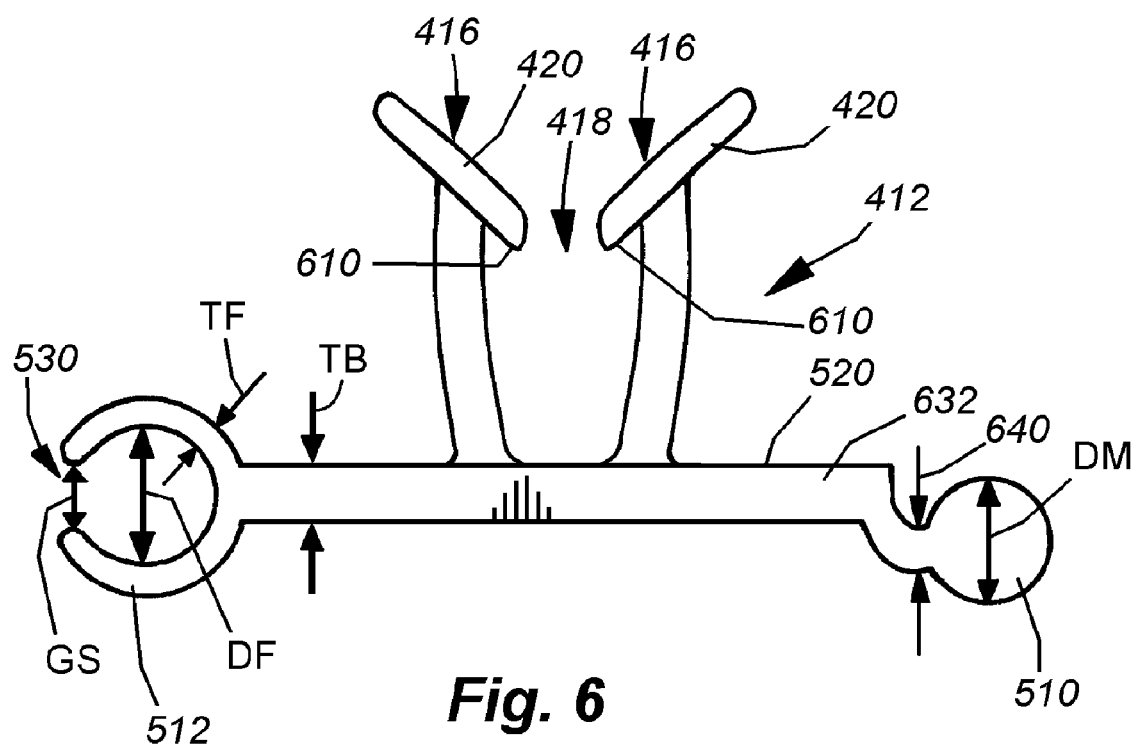
FIG. 6 is a side view of the clip of FIG. 5.

FIG. 4 shows a festooned grouping 400 of dual-ganged clips 410 according to an embodiment of this invention. With reference also to FIGS. 5 and 6, the clips 410 comprise a pair of opposed clip members 412 (also sometimes referred to herein as "clips"), joined by a central shaft segment 414. Each discrete clip 410 in the festooned grouping is a unitary structure, with the clip members 412 and adjoining intermediate segment 414 being molded together as a single unit. As will be described below alternate forming techniques, such as extrusion are also contemplated.

The clips 410 of this invention can be constructed from a variety of materials, which will also be described in further detail below. In general, the material should be durable, capable of withstanding reasonable levels of heat and pressure and flexible so as to provide a good spring material. To this end, it is noted that each clip member 412 includes a pair of upright leg assemblies 416 extending from a generally planar, central base 520, which define therebetween a gap 418. This gap 418 allows insertion of the bead of a listing member (or other structure-to-be-secured) thereinto. In general, the legs are adapted to move elastically away from each other as a bead is passed through the gap.

Referring particularly to FIGS. 5 and 6, the leg assemblies 416 each include a respective inwardly slanted hook or barb 420 that together help to guide and/or funnel the listing into the gap 418. In addition, the barbs 420 each define an inner shoulder 610 (FIG. 6) that restricts outward movement of the listing, or other structural member, once it is forcibly inserted though the gap 418. The leg assemblies 416 are sized in thickness so that they exhibit a predetermined level of spring elasticity with respect to the central clip base 520. The size and shape of the clip base is highly variable. While not shown, the central clip base 520 can include a reinforcing rib, or other reinforcing structure, which extends below the flat upper portion 632 to help prevent flexure and/or breakage of the base 520 as the leg assemblies 416 are spread apart in certain embodiments. Any additional base reinforcement, as well as the general perimeter shape of the base 520 (shown here as a basic rectangle) are adapted to provide needed surface area for adhesion to the foam substrate as will be described further below. The particular structure of the base and leg assemblies are both highly variable and a variety of reinforcing ribs, flanges and other structures can be appended to each clip member as appropriate. The degree of reinforcement depends, in part, on the strength and durability of the materials employed to form the clip and the environment to which the clip is exposed during assembly and subsequent use.

Notably, extending from opposite ends of the base 520 (in a direction transverse to the elongation of the segment 414) is provided a pair of attachment members or "connectors" 510 and 512. In this embodiment, one attachment member 510 is an elongated cylindrical male connector and the opposing attachment member 512 is an open, semi-cylindrical female connector. The diameter DM of the male connector conforms relatively closely to the inner diameter DF of the female connector. In fact, DM can be slightly larger than DF in order to define a friction fit to maintain a given angular orientation between joined connectors 510, 512.

As shown particularly in FIG. 4, on adjacent clip members 412, each of the male connectors 510 is nested within a respective female connector 512 to define the depicted, festooned grouping of clips 400. The open gap 530 in each female connector includes the spacing distance GS (see FIG. 6) that is generally greater than the distance of the male connector base 640 (see FIG. 6), which extends between the central clip base 520 and the body of the mail connector 510. In this embodiment, the connector base 640 is a curved segment that positions the male connector slightly below the top plane of the central base 520. As will be described below, the female connector gap GS allows for limited rotational movement of male connectors when nested within female connectors. For the purposes of this embodiment, the male connector diameter DM is approximately three millimeters. The female connector inner diameter DF is approximately three millimeters with a slight reduction in relative size to provide the desired friction fit. The gap distance GS is approximately two millimeters, while the thickness TF of the female connector 512 is approximately one millimeter. The width WC (FIG. 5) of the male and female connectors is approximately eight millimeters. It is noted that these measurements are all exemplary and can be varied as appropriate depending upon the materials used and the application for the clip. In general, in the depicted applications, measurements such as width WC and diameter DM/DF can vary by several millimeters in alternate embodiments. The dimensions of the leg assemblies 416 are, likewise, highly variable. The leg assembly dimensions can be based upon the size and shape of the listing being engaged and other factors, such as the thickness of the foam substrate. The thickness TB of the base 520 is in a range of between approximately 1.5 to 2 millimeters in an exemplary embodiment. The thickness 640 of the male connector base is approximately one millimeter. This is sufficiently smaller than the gap distance DF for a female connector to allow the above-described rotational movement between clips, within a pre-determined range of arcuate, rotational movement.

Referring further to grouping 400 shown in FIG. 4, it is noted that each dual-ganged clip 410 is provided with alternating female and male connectors 512, 510 (respectively) on a given side of the clip. In other words, as depicted, the left hand clip member includes a male connector 510, while the right hand clip member includes a female connector 512. In the exemplary dual-ganged arrangement, this ensures that each clip is "ambidextrous" with respect to adjacent clips. In other words, each clip can be attached to adjacent clips in either of two orientations. This, of course, assumes that all clips are assembled with leg assemblies 416 facing the same (upward) direction. In alternate embodiments, male connectors can both be disposed on the same clip side and female connectors can both be placed on the opposite clip side. Such clips would not exhibit the above-described ambidextrous capability.

In the depicted embodiment, a central enlarged tab 560 is provided along the connecting segment 414. This tab is optional, and is, in part, a byproduct of the molding processors used to form the clip 410. However, this tab 560, as well as other structures on the clip 410, can be used to provide an identifying mark (such as the depicted "X"), which may indicate information manufacturing date, lot number and/or other desirable data. The enlarged tab 560 may also assist a worker in grasping the given clip for assembly into a foam structure. Similarly, the clip may provide a useful grasping point for removal of the clip from a clip-formation mold using manual or automated possesses.

In this embodiment, the base 520 of each clip also includes opposing throughout holes 570. These holes are optional, but can be sized and arranged so as to allow the clip segment to be driven by an appropriately sized and shaped tractor-pin-feed drive unit. Such a unit is particularly desirable where clips are fed in a continuous line, as will be described further below.

Figure 7:
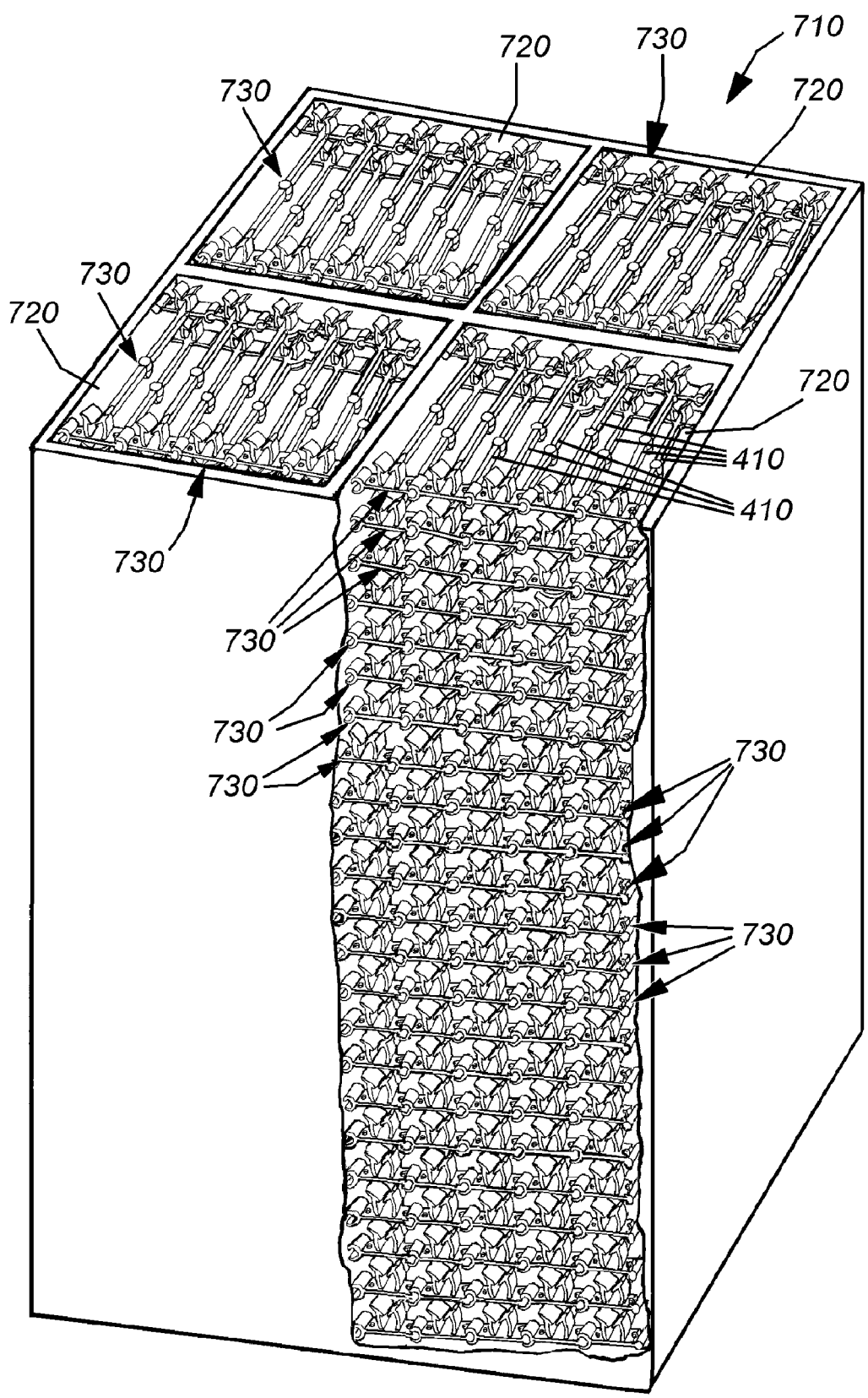
FIG. 7 is a partially cut-away perspective view of a storage and dispensing box for use with predetermined-size festooned groupings of dual-ganged clips according to an embodiment of the invention.

The number of clips grouped together, in accordance with the arrangement of FIG. 4, can be highly variable. In practice, an unlimited number of clips can be grouped together, thereby extending the group continuously along a line elongation (dashed line 450 in FIG. 4) define a festooned grouping of clips that suits a given end user's needs. One possible arrangement of grouped clips of clips is shown in FIG. 7. As depicted, a box or crate 710 has been provided with four separated compartments 720 and an open top. Within each compartment 720 is a stack of festooned groupings of clips 730. In this embodiment, each clip grouping 730 includes five interconnected, dual-ganged clips 410. The actual number of connected clips in a stacked grouping is highly variable in alternate embodiments. The exemplary group of five festooned clips generally provides for an easily manipulated size and shape for the average worker. By providing an integral, assembled group of clips, it stacks easily with respect to other groups without the risk of entanglement between groups. This is, in part, because each line of assembled clip members essentially establishes a continuous, flat strip that lies squarely on the tops of the leg assemblies of the underlying group. Hence, each grouping is supported by the combined expanse of leg assemblies in the underlying group. This prevents birds-nest-style entanglement that would result from a loosely packed supply of individual dual-ganged clips. The walls of each compartment are sized to restrict lateral (aligned with the connecting segments) and front-to-rear movement of each grouping. The flat bases of the clips remain squarely positioned over the leg assemblies of the underlying group in the stack.

In the exemplary storage embodiment of FIG. 7, there are twenty-three layers of clip groups divided into four compartments. A worker can easily lift each group out as a single unit as needed. With proper sizing, the box 710 can be arranged to define a cube with an approximate dimension of twelve inches by twelve inches by twelve inches in an exemplary embodiment. Boxes having other sizes, shapes and compartment arrangements are expressly contemplated in alternate embodiments.

In use, a worker or mechanical device removes a grouping of clips 730 from the top of a stack in one of the compartments 720. As needed each individual clip is then detached from the grouping by either (a) applying front-to rear tension to pull the clip away from the adjacent clip in the grouping pulling them apart (thereby spreading the female connector gap 530 and overcoming the spring force of each female connector, or (b) are sliding the clip laterally (in the direction of extension of the connecting segment (414)) relative to an adjacent clip in the grouping. Lateral sliding requires less force in most instances, but may require more dexterity than simply pulling clips apart. In either case the material of the clip member and the dimensions of male and female connectors are adapted to allow application of reasonable force without causing the clips to break. Once separated, clips can be assembled into a mold cavity by hand, or automated action, as described generally below.

Figure 8:
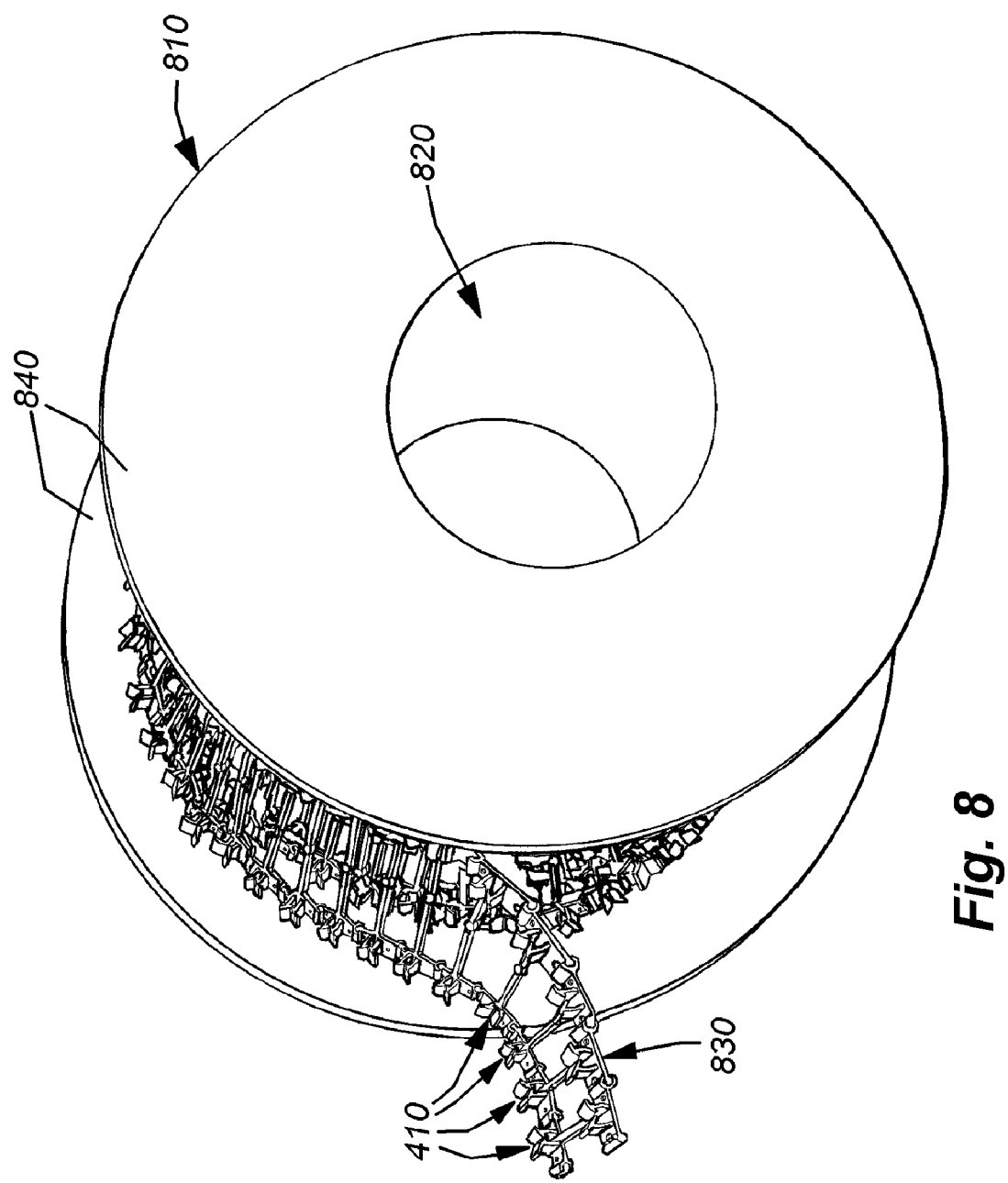
FIG. 8 is a perspective view of a storage and dispensing spool for use with continuous-run, festooned grouping of dual-ganged clips according to an embodiment of the invention.

Because the novel system for allowing grouping of clips of this embodiment provides for an unlimited length and a moderate degree of angular rotation between assembled groupings of clips, the system lends itself to the provision of a long, continuous length of clips on a reel or spool. An exemplary spooled arrangement of clips is shown in FIG. 8. The spool 810 includes and open central core 820 that supports a continuous length grouping 830 of clip s 410 in accordance with an embodiment of this invention. Because the bases of the clips form a continuous surface, they rest fully supported over the leg assemblies of underlying clips without falling through the underlying clips. To help prevent entanglement, this embodiment, the spool 810 includes two closely fitting side flanges 840 that restrict axial movement of clips so that each layer of grouped clips remain squarely located over the leg assemblies of the underlying clip layer.

Figure 9:
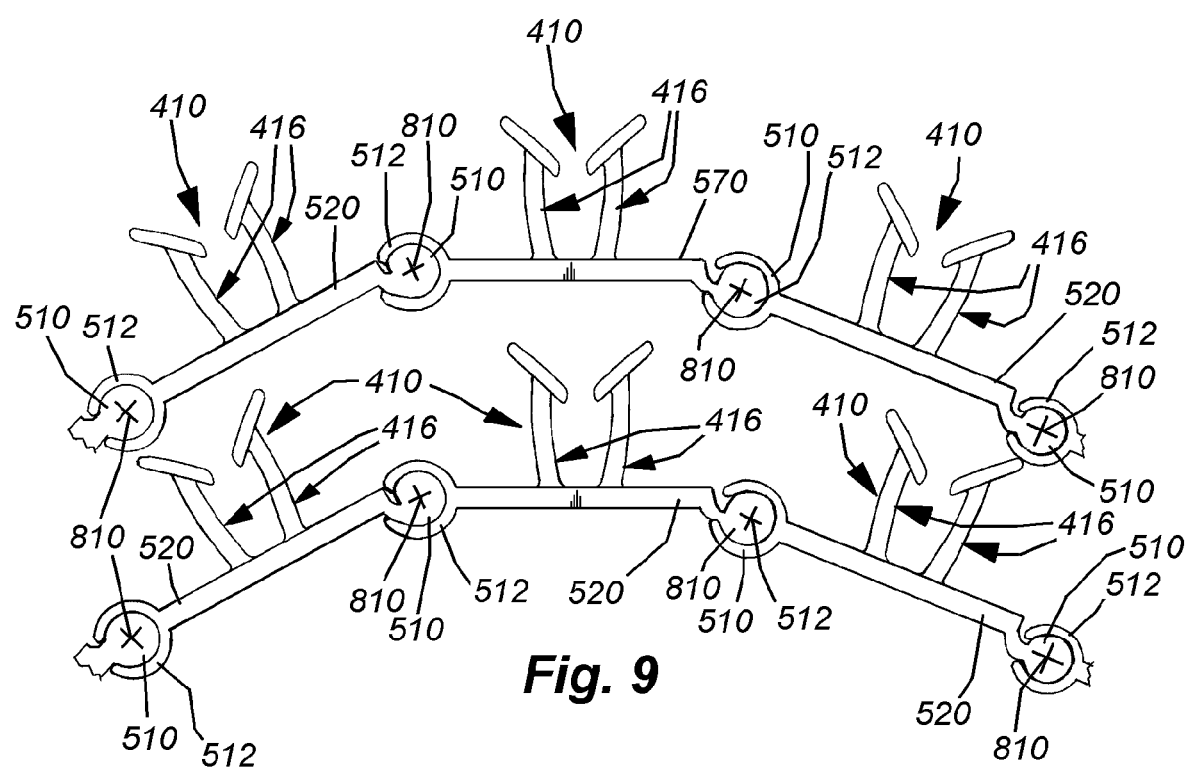
FIG. 9 is a partial side view of two layers of spooled clips in accordance with the embodiment of FIG. 8.

Also referring briefly to FIG. 9, the relationship between layers of stacked clips on a spool is shown in further detail. As depicted, each clip 410 is allowed to angularly deflect about a respective rotational axis 810 relative to an adjacent clip. The angular deflection (as defined by the relative orientation of the plane of each clip's base with respect to that of an adjacent clip's) of each clip with respect to an adjacent clip, in a spool arrangement, is determined by where the line of connected clips are with respect to the core 820. The minimum diameter of the spool core is generally restricted by the maximum bend angle between adjacent, connected clips. The bend angle can be varied, in part, by varying the diameter of the male and female connections 510 and 512 and increasing the width GS of the female connector gap spacing 530. However, angular deflection is essentially limited to a predetermined range that corresponds to a minimum core diameter in this embodiment.

Figure 10:
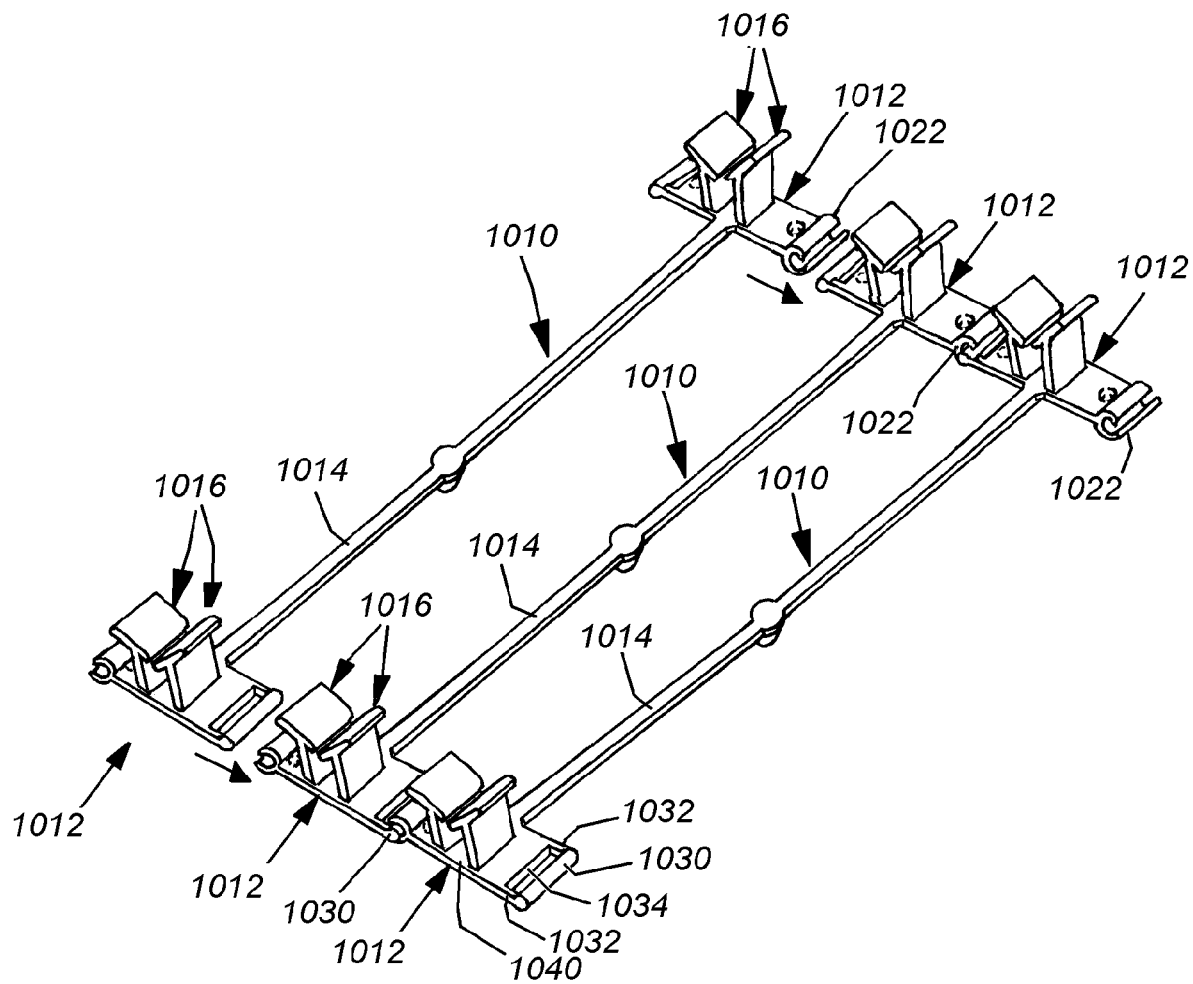
FIG. 10 is a perspective view of an exemplary festooned grouping of a plurality of dual-ganged clips, adapted for greater angular deflection between clips, according to an alternate embodiment of this invention.

An alternate embodiment for a clip 1010 is shown in FIG. 10. This clip 1010 also consists of a dual-ganged configuration with clip members 1012 on each of opposing ends of a narrowed, central joining segment 1014. This clip 1010 includes similarly constructed leg assemblies 1016 to those described above with respect to the clip 410 for engaging an appropriately dimensioned listing bead. The female connector 1022 of each clip is sized and arranged similarly to the female connector 512 described above. However, the male connector 1030 for each clip member 1012 is arranged on a pair of forwardly extending side braces 1032 that define an open central well or slot 1034 between the central base 1040 of the clip member 1012 and the cylindrical body of the male connector 1030. This well is sized and arranged so that, when a female connector 1022 is attached to a male connector 1030, the female connector rides within the slot 1034. In other words, the slot 1034 has a width in each of two orthogonal directions that is generally greater than the corresponding thickness and width of the female connector.

Figure 11:
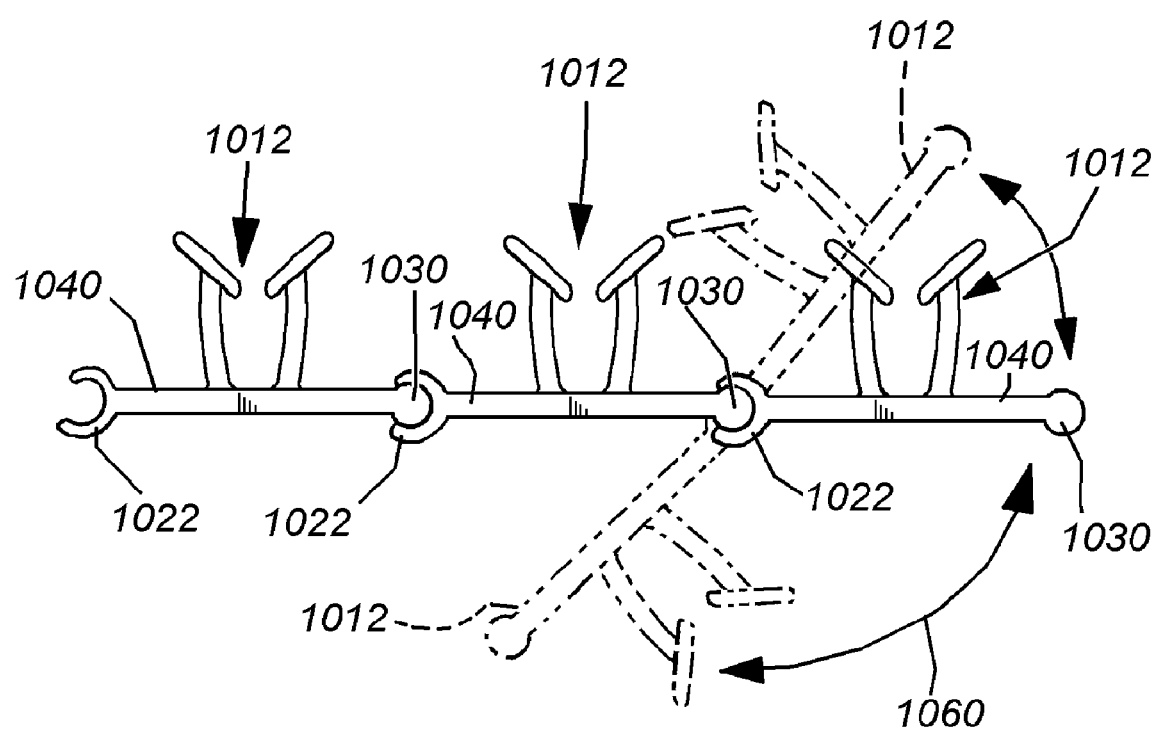
FIG. 11 is a side view of the festooned grouping of clips according to FIG. 10 illustrating an increased range of possible angular deflection.

As shown further in FIG. 11, the relative arrangement of the male connector 1030 and female connector 1035 allows each clip connected to move rotationally within a substantial range of angular deflection (shown in phantom) to allow the line of connected clips to be wrapped around a small-diameter core. In this example, the connected clips may actually bend to relative angles (defined by the plane on each clip's central base 1040) in excess of 90 degrees (see double-curved arrow 1060). This added range of inter-clip angular deflection may also be beneficial where clips are likely to be fed along a continuous line that contains various turns and bends. Also, this arrangement may be beneficial where lines of clips are subjected to significant bending during manual handling. Over-bending of clips with a low-degree of tolerable angular deflection may otherwise cause their ends to break.

Figure 12:
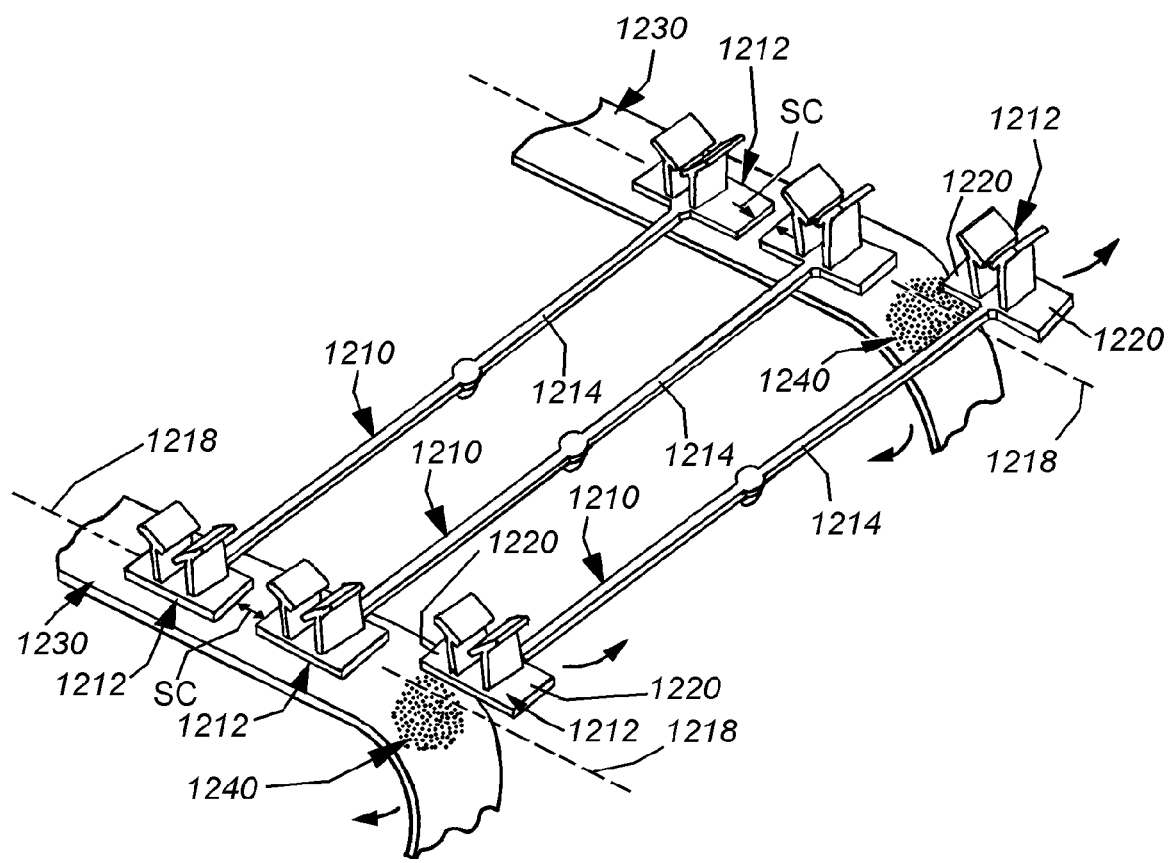
FIG. 12 is a perspective view of an exemplary festooned grouping of a plurality of dual-ganged clips, employing a pair of flexible strips to which ganged clips are removable attached, according to an alternate embodiment of this invention.

Another technique for providing a festooned grouping of clips is shown in FIG. 12. In this embodiment, the exemplary clips 1210 include two clip members 1212 joined by a unitary central segment 1214. In this embodiment each clip member also includes opposing ends 1220 (in the direction of feeding/grouping-dashed lines 1218) that are free of any clip-to-clip connectors, or other like structures. A continuous flexible strip or tape 1230 underlies each clip member 1212. The clip members 1212 are placed at a predetermined spacing SC along each strip 1230. Each strip 1230 can carry a continuous coating of adhesive, or a concentrated adhesive spot 1240 that specifically underlies the location of each attached clip member 1212. The adhesive can be any desirable industrial adhesive capable of removably securing the clip to the strip. Likewise, the strip 1230 can be constructed from paper, polymer sheet or any other synthetic/natural sheet material with the ability to flex and bend as shown. As clips 1214 are needed by a worker or automated device, they are torn from the strip, whereby the adhesive contact between the strip and each overlying clip member is broken. In alternate embodiments, one or more strips 1230 can be adhered to each clip between clip members, within the center region of the grouping, along, for example, the central segment 1214. In still further alternate embodiments, a pair of confronting strips may sandwich the segments 1214. In such an arrangement, clips can be removed by separating the two strips and withdrawing the clip therefrom in the manner of peeling a banana skin to withdraw the fruit.

While a tape or strip-base holding system has advantages in that it is highly flexible, it should be noted that this arrangement also provides an extra component that may add waste, and may become fouled in certain machinery. Thus, this embodiment may not be desirable in some instances.

Figure 1:
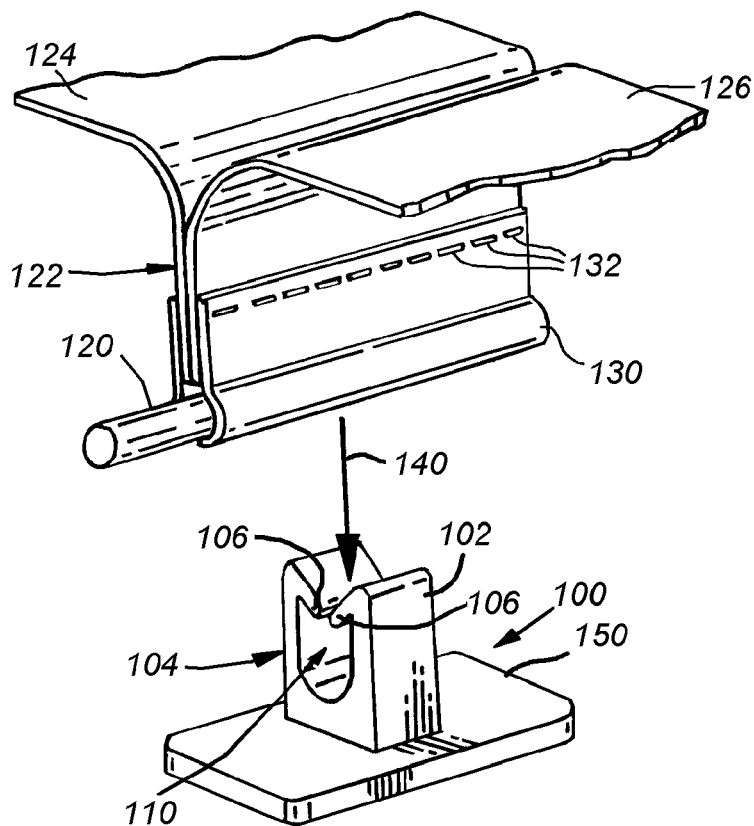
FIG. 1, already described, is an exploded fragmentary perspective view of a trim cover bead and clip according to the prior art.
Figure 2:
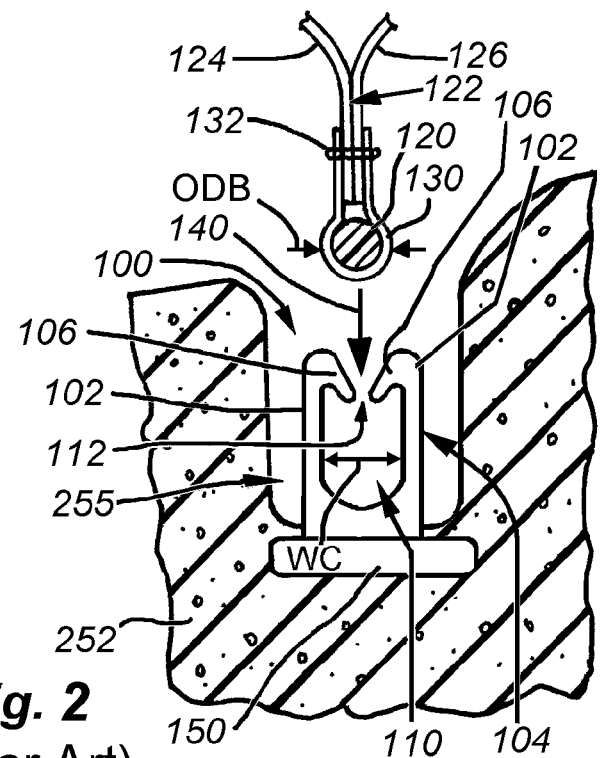
FIG. 2 is, already described, is a fragmentary side cross section of the clip and trim cover bead of FIG. 1 mounted in an exemplary substrate trench.
Figure 3:
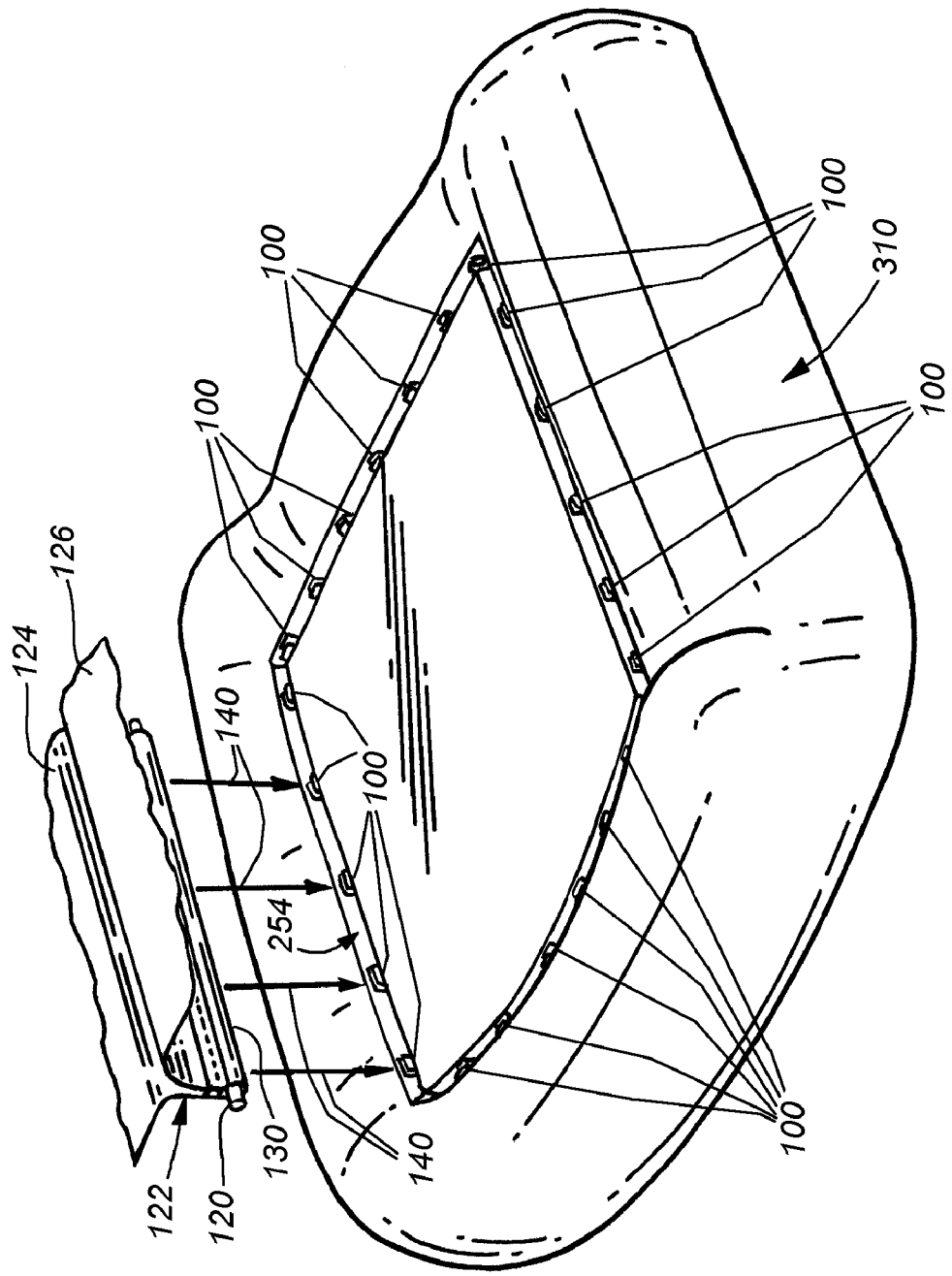
FIG. 3, already described, is a fragmentary perspective view of an exemplary substrate (a seat bottom) having a surrounding inboard trench with a plurality of clips molded thereinto and receiving a piece of a trim cover bead.
Figure 13:
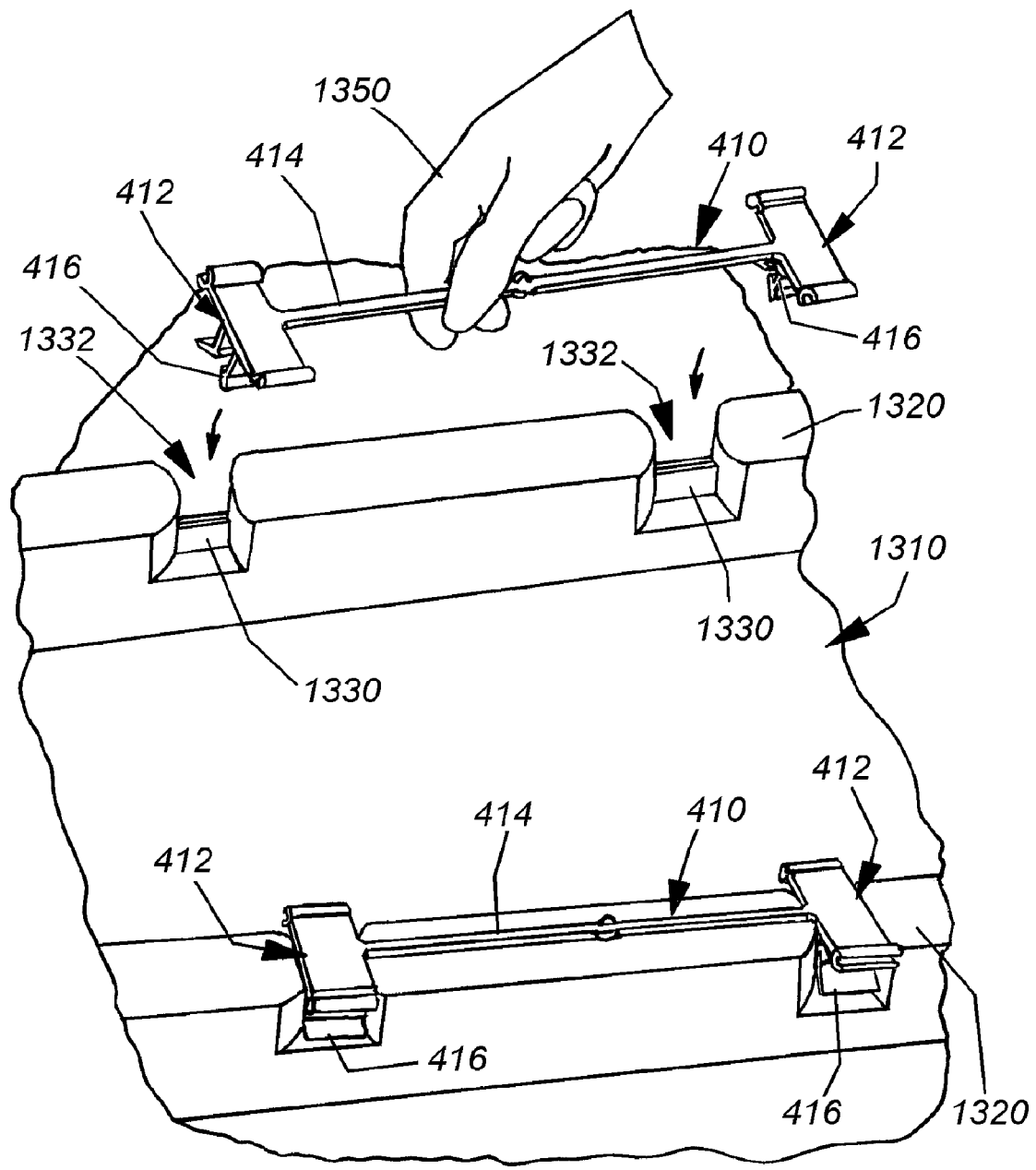
FIG. 13 is a partial perspective view detailing a typical application of dual-ganged clips to a mold cavity according to an embodiment of this invention.

With reference now to FIG. 13, a typical procedure for employing clips 410, once they are removed from a festooned group is shown. In this embodiment, a portion of an exemplary foam cushion mold cavity 1310 is depicted. This mold cavity includes rails 1320 upon which ganged clips 410 are mounted. In particular, each clip member's leg assemblies 416 are passed over narrowed webs 1330 formed within breaks 1332 in the rails 1320. As liquid foam is introduced to the mold cavity, the rails 1320 define trenches within the foam, such as those described above with reference to FIG. 3. The clips subsequently reside in the trenches with gaps between their legs exposed for insertion of listing. The rail webs 1330 provide accurate reference point for positioning clips during the molding process. They also prevent undesired movement of the clips while the foam is applied and cures.

As shown in FIG. 13, a worker's hand 1350 grasps a central segment 414 of the subject clip 410 and inserts it so that its leg assemblies 416 surround the web. The completed insertion is shown in the foreground of the illustration. When liquid foam is applied, it will surround and engage the clip members 412 and the central segment 414 so as to retain them with respect to the foam. As noted above, the particular materials employed to construct the clip 410 influence the effectiveness of the adhesion between the solidified foam and the embedded clip. In an alternate embodiment, it is contemplated that the process for insertion of single or ganged clips can be automated. One such automation technique is described with reference to rail clips. This process employs an end-effector that grasps and deposits clips onto a mold cavity. This process is described with reference to U.S. patent application Ser. No. 11/615,954 entitled CLIP FOR JOINING TUBULAR MEMBERS TO SUBSTRATES by Andrew W. Santin et al., the teachings of which are expressly incorporated herein by reference. It should be clear that a variety of robotic and/or electromechanically techniques can be employed to affect automation of clip placements. Such automation can employ a continuous feed of clips from for example, a spool as shown in FIG. 8.

The above-described embodiments show and define a dual-ganged clip. A dual-ganged clip has certain advantages in particular applications. It allows for ambidextrous interconnection, is not so elongated as to flop or flex excessively and is relatively easy to manipulate. However, it is expressly contemplated that the number of ganged clip members on a given groupable clip structure can be greater or less than the two joined clip members 412 shown and described above.

Figure 14:
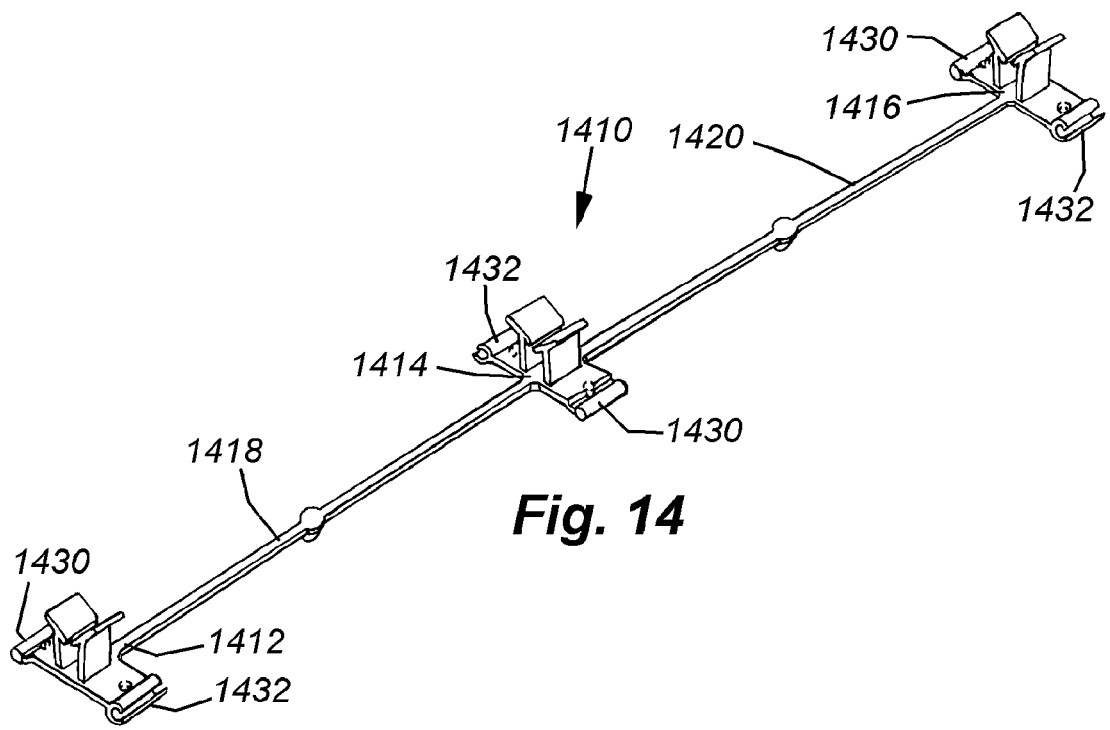
FIG. 14 is a perspective view of a triple-ganged clip adapted to be assembled into a festooned grouping of variable size according to an alternate embodiment of this invention.

Thus, FIG. 14 details a triple-ganged clip 1410. The three separated clip members 1412, 1414 and 1416 on this unitary clip 1410 are joined by intervening segments 1418 and 1420. Each clip member 1412, 1414 and 1416 includes an associated male connector 1430 and female connector 1432, which are generally similar in size and shape to the male connector 510 and female connector 512 described above. A three-ganged implementation lacks the ambidextrous capability of the above-described embodiments. However, such a three (or-more) ganged clip arrangement can be stored in a similarly festooned grouping (box or spool), and handled in a similar manner to those described above.

Figure 15:
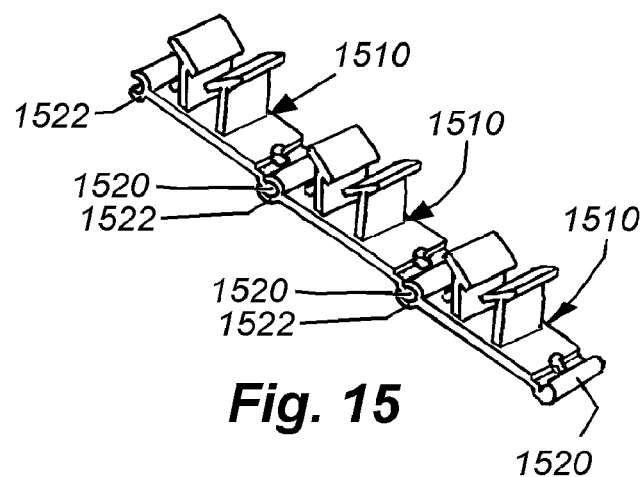
FIG. 15 is a perspective view of a festooned grouping of single clips in accordance with an alternate embodiment of this invention.

In another embodiment, a single clip member 1510 is shown in FIG. 15 as part of a festooned grouping of single clips. This grouping includes male connectors 1520 engaging adjacent female connectors 1522. These connectors define geometry similar to, or the same as that attached to the above-described clip members 412. Single ganged and multi-ganged from multi-ganged clips can all be provided on an appropriately sized spool to be dispensed as needed to a worker or automated clip-placement device.

Figure 16:
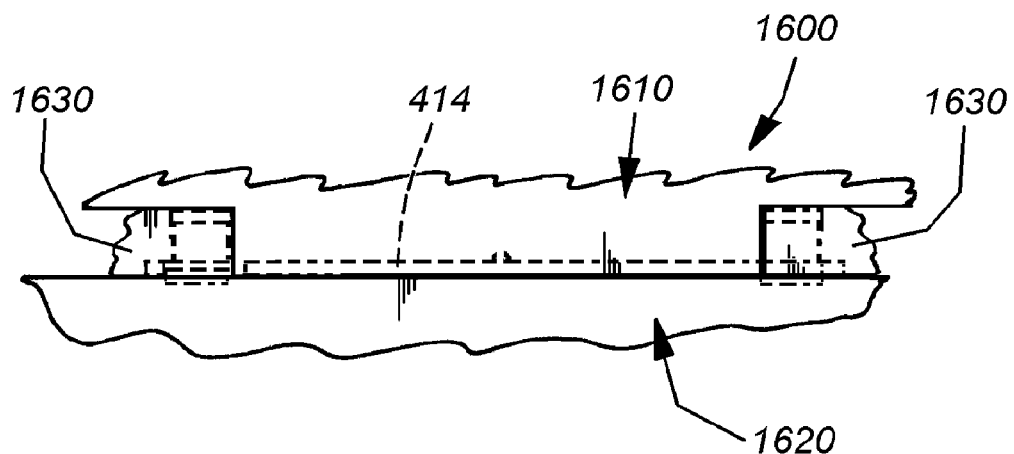
FIG. 16 is a somewhat schematic exposed side view of a mold assembly used to form multi-ganged festooned clips in accordance with an embodiment of this invention, shown in a closed orientation.
Figure 17:
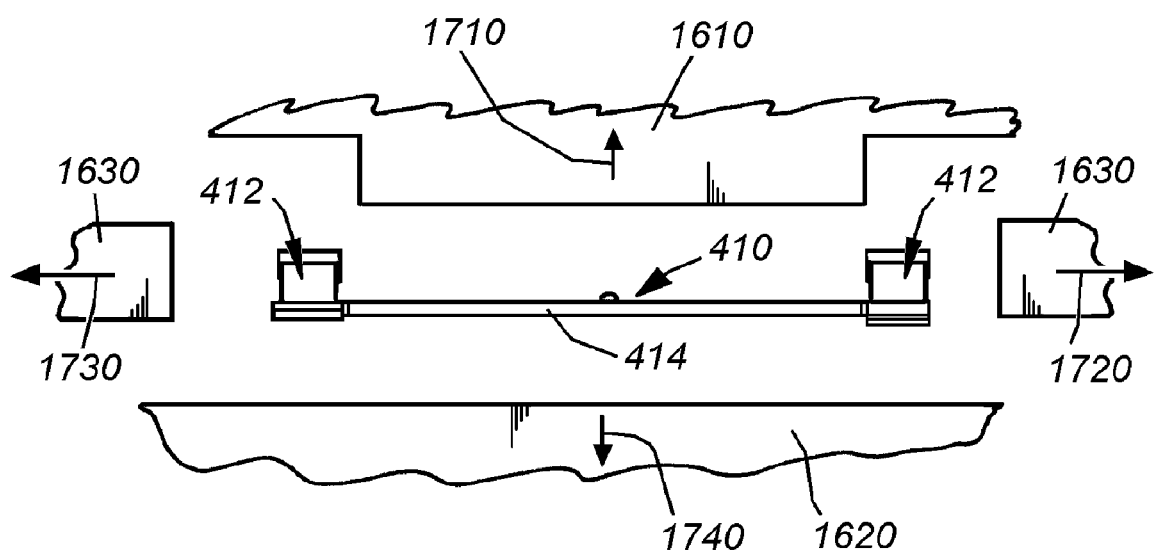
FIG. 17 is a somewhat schematic side view of the mold assembly of FIG. 16 shown opened so as to allow removal of an exemplary dual-ganged molded clip.

By employing appropriate manufacturing techniques, clips can be formed using extrusion, injection molding or other commercially available forming procedures. In a case of an extrusion, clips should be formed so that their features are relatively similar in an elongated direction. As the reader may surmise, such extrusion manufacturing procedures are readily employed for forming a single clip, such as that shown in FIG. 15. However, where the clip involves multiple-ganged clip members separated by narrow segments, extrusion may not provide the most effective forming technique. For such multi-ganged clips, an exemplary injection molding technique is, thus, detailed if FIGS. 16 and 17. As shown in FIG. 16, the liquefied material that, when solidified, forms the finished clip is injected into a mold cavity, which defines the clip outline (in phantom lines). This exemplary mold 1600 is defined by four engagable and disengageable pieces. A shown, the mold 1600 consists of a top section 1610 that generally defines the middle segment 414, a bottom section 1620, which forms the base of the clip, and two side sections 1630 that define the cavities for the corresponding clip member base and legs.

Once the liquid clip material has solidified within the mold 1600, the mold sections 1610, 1620 and 1630 are withdrawn as shown in FIG. 16 according to a defined order. In particular, the bottom section 1610 can be withdrawn first (arrow 1730). This is followed by withdrawal of the side sections 1630 (arrow 1720), and finally by withdrawal of the top section 1620 (arrow 1710). A completed clip 410 is, thus, reviled and ready for assembly into a festooned grouping. A variety of alternate mold geometries can be employed in alternate embodiments.

Note that it is contemplated that available part-forming techniques can be employed to mold (or otherwise form) a plurality of clips together in a festooned grouping that with the constituent clips already removably connected together. In other words an entire festooned grouping is molded together. In such a procedure, a thin liquid-impermeable boundary is established between male and female connectors as they are molded. When the side pieces of such a mold are removed, the previously separated male and female connectors are brought into contact with each other. At this time they are separate components and capable of rotating with respect to each other.

As described above, it is desirable to construct a clip in accordance with this invention using materials that exhibit durability, heat-resistance, and the ability to chemically bond with ordinary foams as used in commercially available seat cushions. Durability and heat resistance are particularly desirable as it is common for the temperature of foam to rise substantially during the molding process, which may melt and/or thermally deform clips constructed from certain materials. Clips may also be prone to breakage and deformation due to the application of roll crushers (which may be heated) to the foam cushion to aid in its formation. These rollers may undesirable crush clips that are constructed from weaker/less-durable materials.

Figure 18:
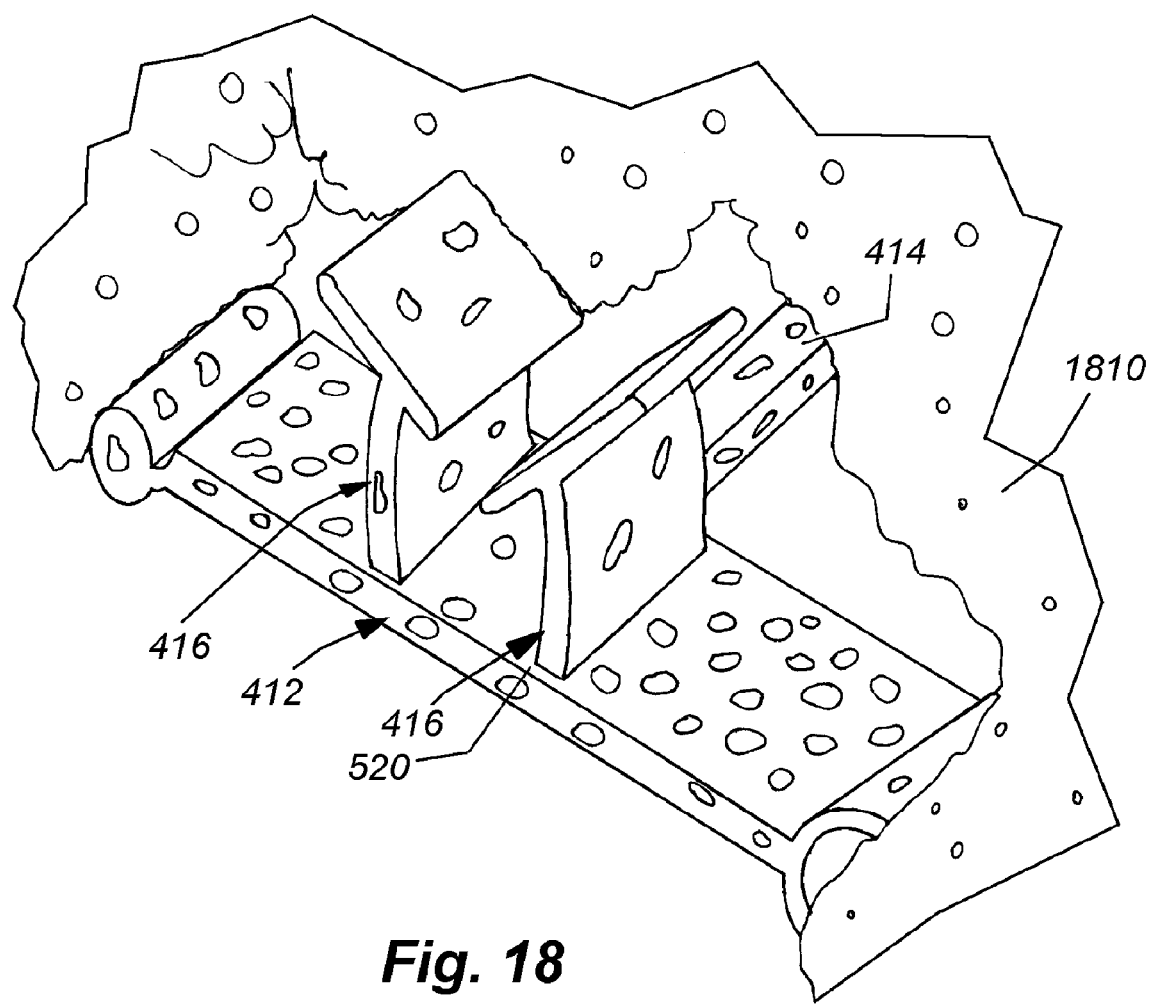
FIG. 18 is a partially exposed perspective view of an exemplary clip constructed from a material in accordance with an embodiment of this invention that exhibits chemical adhesion in contact with commercially available foam substances.

With reference to FIG. 18, surface bonding of the clip member 412 relative to the overlying foam 1810 is illustrated. In a typical implementation, the foam has been removed from the region surrounding the clip to show a surface that has been etched due to the action of chemical bonding with the foam while it is in liquid form, as shown by the depicted roughened surface on the clip member 412 and adjoining segment 414. The surface of a clip member can be relatively smooth, or can be provided with a variety of different types of surface textures and/or structures that increase bondable surface area.

It is contemplated that foams can typically comprise polyurethane compositions that are based upon methylene-diphenyl-diisocyanate (MDI) and toluene-diisocyanate (TDI), respectively representing the commercial application of so-called cold cure and hot cure foam technologies. Each of these types of foams have been shown to react chemically with certain types of hard polymers (plastics) during curing from a liquid to a solid state. A variety of materials possess these characteristics, and can be used to form clips. Some examples include, but are not limited to, nylon, polybutylene terephthalate (PBT), and polycarbonate (PC) compounds. In particular, polycarbonate can be transparent, allowing defects to be detected, has excellent molding characteristics, allowing small features to be defined in parts and has superior heat-resistance, which better survives the exothermic effects of certain foams (in which temperatures can exceed 130 C), without melting or deforming under the pressure of a roll crusher. Polycarbonate is also quite durable and long-lived under cyclic loading.

In summary, the above-described single or ganged clips, which can be provided as a festooned grouping, afford a human or automated handler with a superior system for efficiently manipulating and placing clips in a mold or other mounting assembly. By selecting appropriate materials, these clips (and other clip types) are effectively and permanently adhered to foam by chemical adhesion. They resist heat and pressure, and exhibit high long-term durability.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while clips can be constructed from a material that readily bonds to liquid foam, in alternate embodiments, all or part of the clip material can be relatively inert to foam and bonded by alternate mechanisms, such as adhesives or mechanical anchoring. In addition, it is expressly contemplated that any of the storage techniques, festooning arrangements and connector structures described above can be applied to clips of any number of ganged clip members (e.g. single, dual-ganged, triple ganged, etc.). Also, while clip members are joined by unitary segments of predetermined length according to illustrative embodiments, it is expressly contemplated that the segment connectors between clip members in a multi-ganged clip arrangement can be completely or partially removable from the clip members in the arrangement. As such, the segments can be variably sized to allow adjustment of the spacing between ganged clip members. Likewise, the clip members can be provide as a multi-piece unit with the clip legs (being possibly more durable) being a separate material with respect to the base (being possibly more reactive to foam). Alternatively, a unitary clip with a multiplicity of co-molded or co-extruded materials can be formed. Furthermore, while male and female connectors in the depicted embodiments are generally cylindrical so as to facilitate angular rotation between adjoining clips, in alternate embodiments (where angular rotation is not desired) the connectors can each define a conforming, nesting, non-circular cross section (such as an oval, polygon, etc.). In such an embodiment, clips would be urged to maintain a predetermined angular orientation with respect to each other. This may be desirable for storage implementations, such as the box of FIG. 7. Moreover, while a particular male and female connector are provided to each clip member in the illustrative embodiments, the general term "connector" should be taken broadly to include genderless connectors that freely interconnect with each other regardless of orientation. Accordingly, this description is meant to be taken only by way of example, and not to otherwise limit the scope of this invention.

What is claimed is:

1. A clip assembly that is formed as a festooned grouping of dual-ganged clips, each being adapted to secure a bead to a foam substrate comprising:

at least one dual-ganged clip including first and second opposed clip members joined by an elongated shaft segment that spacedly disposes the first and second opposed clip members apart;

said first clip member including a first clip member base with first clip legs extending from said base and each having barbs that define an inner shoulder that is constructed and arranged to secure a bead thereinto, the bead extending from the first clip member base, and the first clip member base having opposing first base ends oriented along a first direction of grouping elongation;

a first connector and a second connector mounted at each of the opposing first base ends;

said second clip member including a second clip member base with second clip legs extending from said base and each having barbs that define an inner shoulder that is constructed and arranged to secure the bead thereinto, the bead extending from the second clip member base, and the second clip member base having opposing second base ends oriented along a second direction of grouping elongation;

said first and second directions of grouping elongation extending in parallel;

a third connector and a fourth connector mounted at each of the opposing second base ends;

at least another dual-ganged clip including third and fourth opposed clip members joined by an elongated shaft segment that spacedly disposes the third and fourth opposed clip members apart;

said third clip member including a third clip member base with third clip legs extending from said base and each having barbs that define an inner shoulder that is constructed and arranged to secure a bead thereinto, the bead extending from the third clip member base, and the third clip member base having opposing third base ends oriented along a third direction of grouping elongation;

a fifth connector and a sixth connector mounted at each of the opposing third base ends;

said fourth clip member including a fourth clip member base with fourth clip legs extending from said base and each having barbs that define an inner shoulder that is constructed and arranged to secure the bead thereinto, the bead extending from the fourth clip member base, and the fourth clip member base having opposing fourth base ends oriented along a fourth direction of grouping elongation;

said first and third directions of grouping elongation being coincident, and said second and further direction of group elongation being coincident;

a seventh connector and an eighth connector mounted at each of the opposing fourth base ends;

said second connector is constructed and arranged to removably engage the fifth connector along said first direction of grouping elongation; and said fourth connector is constructed and arranged to removably engage the seventh connector along said second direction of grouping elongation.

2. The clip assembly as set forth in claim 1 wherein the first connector and the fourth connector each comprise a male cylinder and the second connector and the third connector each define a female inner semi-cylindrical surface having an inner diameter that conforms to an outer diameter of the male cylinder, the female inner semi-cylindrical surface including a gap constructed and arranged to provide clearance from a connector base that supports the male cylinder.

3. The clip assembly as set forth in claim 2 wherein the fifth connector and the eighth connector each comprise a male cylinder and the sixth connector and the seventh connector each define a female inner semi-cylindrical surface having an inner diameter that conforms to an outer diameter of the male cylinder, the female inner semi-cylindrical surface including a gap constructed and arranged to provide clearance from a connector base that supports the male cylinder.

4. The clip assembly as set forth in claim 3 wherein the connector base and the gap are each sized and arranged to allow the first clip member base to rotate angularly with respect to the third clip member base within a predetermined range of rotation.

5. The clip assembly as set forth in claim 1 wherein the clip assembly is stored in a box with engaging upright sidewalls in a stack with the first clip member base and the second clip member base respectively overlying legs of a fifth clip member base and legs of a sixth clip member base.

6. The clip assembly as set forth in claim 5 wherein the clip assembly is stored in a stack with the third clip member base and the fourth clip member base respectively overlying legs of a seventh clip member base and legs of an eighth clip member base.

7. The clip assembly as set forth in claim 1 wherein the clip assembly is stored on a spool.

8. The clip assembly as set forth in claim 1 wherein the elongated shaft segments of respective one and another dual-ganged clips extend in parallel and each have opposed ends that extend in a direction between facing side surfaces of respective first and second clip member bases.

9. The clip assembly as set forth in claim 8 wherein the elongated shaft segments have a length greater than a width of the clip member base to assist in grasping the clip at the elongated shaft segment and each elongated shaft segment connects to the clip member base at the facing side surface thereof.

10. The clip assembly as set forth in claim 9 wherein the length of each elongated shaft segment is an order of magnitude greater than the clip member base width.

11. The clip assembly as set forth in claim 1 wherein at least the first clip member base and the second clip member base each include a drive structure constructed and arranged to allow the assembly to be driven in the direction of grouping elongation by a drive mechanism.

12. The clip assembly as set forth in claim 11 wherein the drive structure comprises tractor pin-feed holes.

13. The clip assembly as set forth in claim 1 wherein at least the first clip member base and the second clip member base are constructed from a clip material that chemically reacts with predetermined foam in a liquid state and adheres to the foam in a cured state.

14. The clip assembly as set forth in claim 13 wherein the clip material comprises polycarbonate.

15. The clip assembly as set forth in claim 1 wherein the first connector and the second connector extend outwardly from a central portion of the first base member to each of the opposing first base ends along the first direction of grouping elongation, such that the first connector and the second connector are disposed outwardly beyond the first clip legs and the first clip barbs along the first direction of grouping elongation so that the first clip member is allowed to angularly deflect about a respective rotational axis relative to an adjacent clip member.

16. The clip assembly as set forth in claim 1 wherein the first connector comprises a male connector for the first clip member base, and the male connector is arranged on a pair of outwardly extending side braces that define an opening between a central portion of the first clip member base and the male connector.

17. The clip assembly as set forth in claim 16 wherein the opening is sized and arranged so that, when a female connector is attached to the male connector, the female connector rides within the opening.

18. The clip assembly as set forth in claim 16 wherein relative arrangement of the first connector and the second connector allows a plurality of connected clip members to bend relative angles in excess of 90 degrees.

19. The clip assembly as set forth in claim 1 wherein each of the clip members are adapted to be mounted on rails in a mold cavity such that, as liquid foam is introduced to the mold cavity, the rails define trenches within the foam and the clip members reside in the trenches with gaps between their respective clip legs exposed for insertion of a listing.

* * * * *